Figure 3:
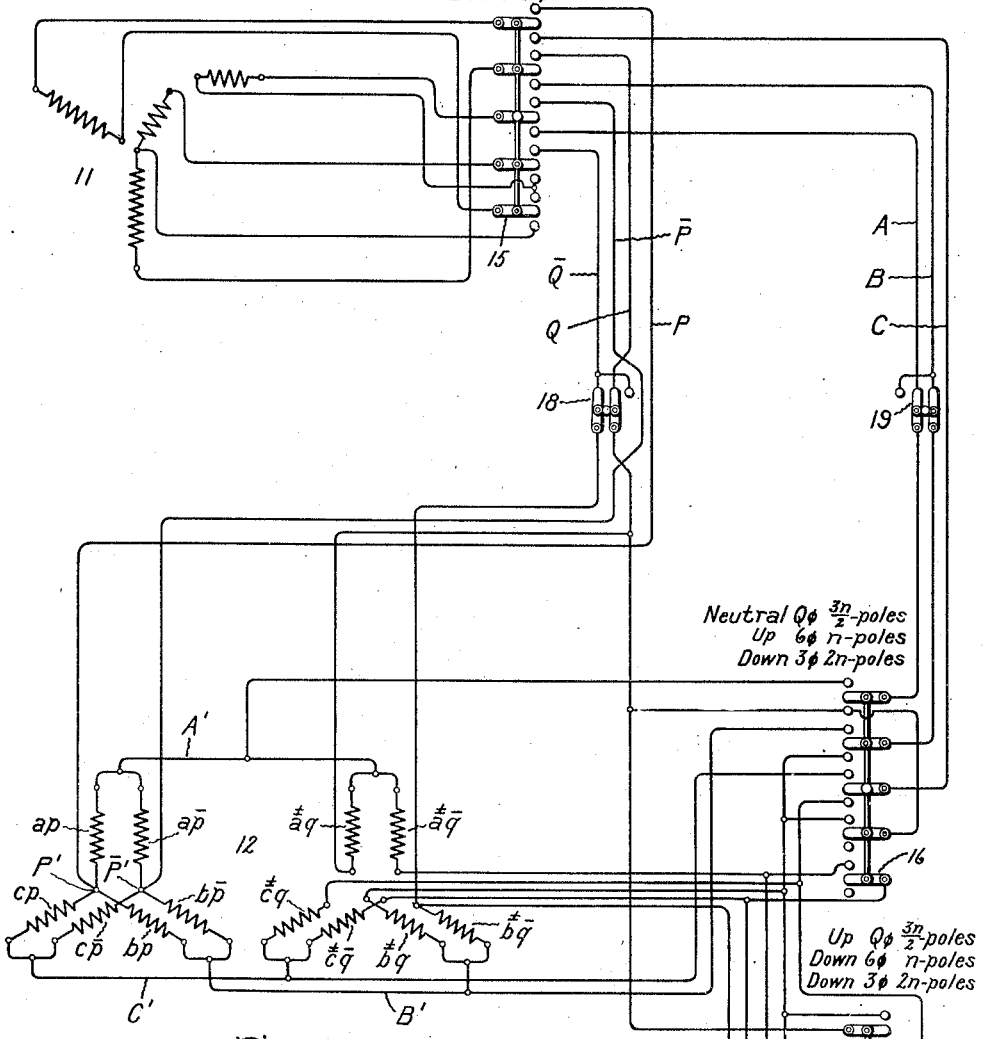

C. MACMILLAN.
MULTISPEED INDUCTION MOTOR.
APPLICATION FILED MAY 31, 1917.

1,356,935.

Patented Oct. 26, 1920.
3 SHEETS—SHEET 1.

Fig. 1.

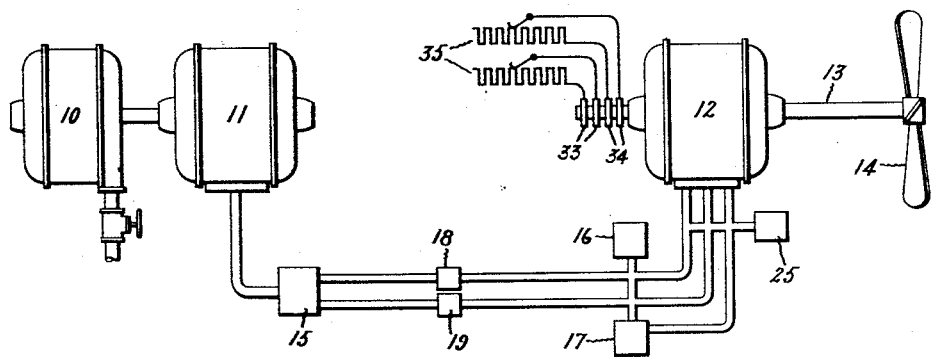

Fig. 2.

| $n$-poles $6\phi$ | a $\bar{b}$ c | $\bar{a}$ b $\bar{c}$ | a $\bar{b}$ c | $\bar{a}$ b $\bar{c}$ | a $\bar{b}$ c | $\bar{a}$ b $\bar{c}$ |
|---|---|---|---|---|---|---|
| $\tfrac{3n}{2}$-poles $Q\phi$ | p q $\bar{p}$ | $\bar{q}$ p q | $\bar{p}$ $\bar{q}$ p | q $\bar{p}$ $\bar{q}$ | p q $\bar{p}$ | $\bar{q}$ p q |
| $2n$-poles $3\phi$ | a b c | a b c | a b c | a b c | a b c | a b c | ap bq cp   aq bp cq   ap bq cp   aq bp cq   ap bq cp   aq bp cq

Fig. 5.  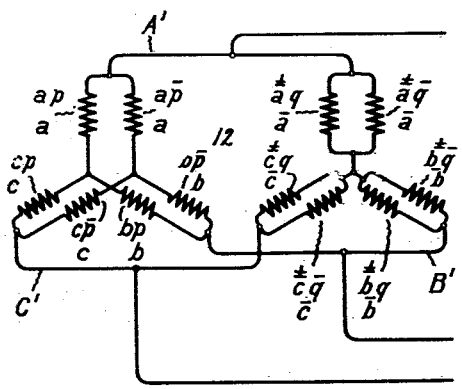
$6\phi$ $n$ poles

Fig. 6.  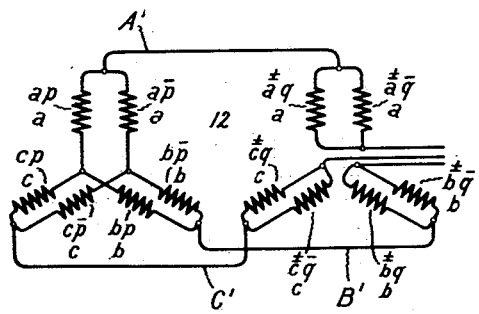
$3\phi$ $2n$ poles

Inventor:
Campbell Macmillan,
by Albert G. Davis
His Attorney.

C. MACMILLAN.
MULTISPEED INDUCTION MOTOR.
APPLICATION FILED MAY 31, 1917.

1,356,935.

Patented Oct. 26, 1920.
3 SHEETS—SHEET 2.

Inventor:
Campbell Macmillan,
by Albert G. Davis
His Attorney.

C. MACMILLAN.
MULTISPEED INDUCTION MOTOR.
APPLICATION FILED MAY 31, 1917.

1,356,935.

Patented Oct. 26, 1920.
3 SHEETS—SHEET 3.

16-POLE 6φ  N    S    N    S    N    S    N    S
⅔ PITCH    a b̄ c ā b c̄ a b̄ c ā b c̄ a b̄ c ā b c̄ a b̄ c ā b c̄ a b̄ c

24-POLE Qφ  N   S   N   S   N   S   N   S   N   S   N   S
100% PITCH  p q p̄ q̄ p q p̄ q̄ p q p̄ q̄ p q p̄ q̄ p q p̄ q̄ p q p̄ q̄

32-POLE 3φ  N   S   N   S   N   S   N   S   N   S   N   S
1⅓ PITCH   a b c a b c a b c a b c a b c a b c a b c a b c

Inventor:
Campbell Macmillan,
by Albert G. Davis
His Attorney.

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

MULTISPEED INDUCTION-MOTOR.

1,356,935. Specification of Letters Patent. Patented Oct. 26, 1920.

Application filed May 31, 1917. Serial No. 171,916.

*To all whom it may concern:*

Be it known that I, CAMPBELL MACMILLAN, a citizen of the United States, residing at Schenectady, in the county of Schenectady, State of New York, have invented certain new and useful Improvements in Multispeed Induction-Motors, of which the following is a specification.

My invention relates to multi-speed induction motors and has for its principal object the provision of an improved multi-speed induction motor. A further object of the invention is the provision of an improved multi-polar induction motor in combination with a plurality of polyphase systems of energy distribution of different numbers of phases. Other objects of the invention will be brought out in the course of the following description.

The synchronous speed of an induction motor is determined as a function of the number of its primary magnetic poles and of the frequency of the alternating current energy supply. Different synchronous speeds may be obtained by providing the motor with suitable means for changing the number of magnetic poles produced by its primary winding, and various arrangements have heretofore been suggested for connecting the coils or circuits of a primary winding so as to produce primary magnetic fields of two or more different pole numbers. With very few exceptions, the changes in connections of the primary winding heretofore suggested for producing two or more different polar arrangements are complicated and require an objectionably large number of circuit-changers or switches. A particular object of my present invention is to provide an induction motor with a primary winding whose circuit connections can be changed with a minimum of complications to produce two or three different primary polar arrangements.

I have found that the change in the connections of the primary winding is facilitated for certain polar arrangements where there is available a plurality of polyphase systems of energy distribution of different numbers of phases. For example, where the primary pole numbers are represented by $n$, $\frac{3n}{2}$ and $2n$, I have found that the primary winding can be very conveniently arranged for these three different pole numbers by supplying three-phase current for $n$- and $2n$- pole numbers and quarter-phase current for $\frac{3n}{2}$-pole numbers. My present invention then consists in providing a source of supply capable of furnishing a plurality of polyphase systems of energy distribution of different numbers of phases in combination with an induction motor whose primary winding is arranged to produce sinusoidal or balanced primary magnetic fields of different pole numbers when connected to such polyphase systems of energy distribution. The source of supply may be an electric generator whose armature windings are arranged to produce the different polyphase systems of energy distribution of the desired numbers of phases.

Figure 4:
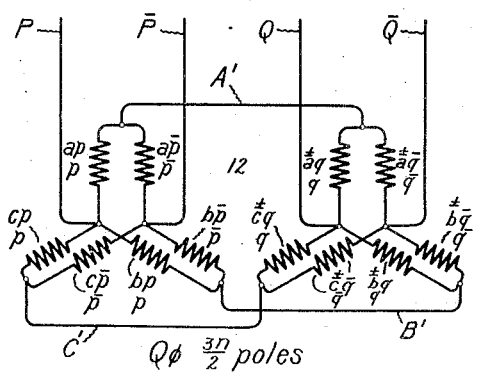
Figure 7:
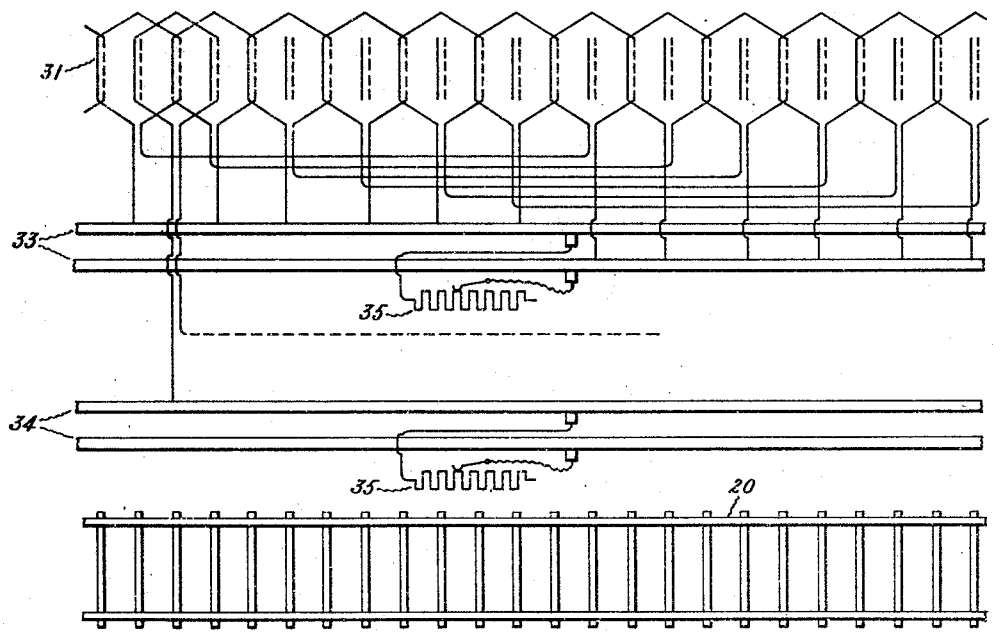
Figure 8:
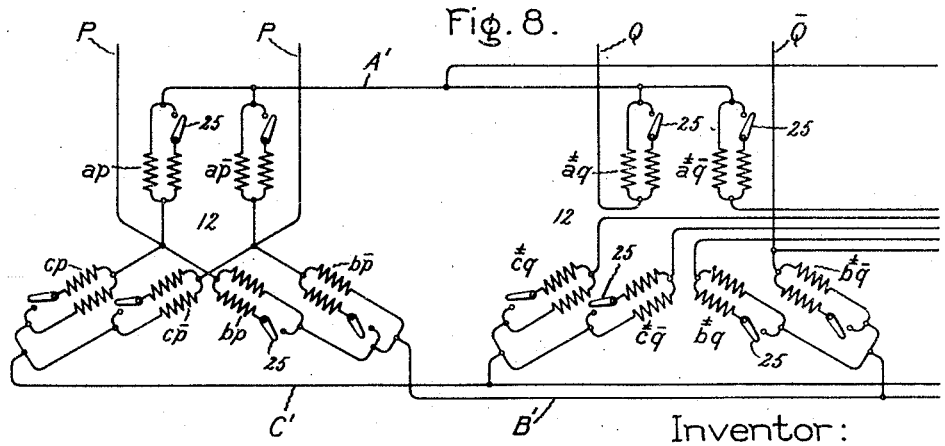

The novel features of the invention which I believe to be patentable are definitely set forth in the appended claims. The principle of the invention together with the construction and mode of operation of induction motors and systems embodying the same will be best understood from the following description taken in conjunction with the accompanying drawings, in which:

Figure 1 is a diagrammatic assembly of a system of electric ship propulsion embodying the present invention; Fig. 2 is an explanatory legend-diagram; Fig. 3 is a diagram of the principal electrical connections of the system of Fig. 1; Figs. 4, 5 and 6 are explanatory diagrams of the different connections of the motor shown in Figs. 1, 2 and 3; Fig. 7 is a diagrammatic view of a modified form of the invention; and Fig. 8 is a diagram of the electrical connections of the motor represented in Fig. 7.

My present invention is of particular advantage in electric systems of ship propulsion. Such systems usually include a turbine-driven alternator delivering polyphase electric energy to suitable induction motors directly coupled to the propeller shafts. In order to provide efficient operation from low speed up to the full speed of the ship, the propeller-driving motors are usually designed for pole-changing. Two or even three different speed ranges may thus be conveniently provided. Speed variations over any particular speed range are obtained by varying the speed of the alternator by adjusting the steam admission to the turbine. Such an electric system of ship propulsion is diagrammatically represented in Fig. 1. An elastic fluid turbine 10 is directly coupled to a polyphase alternator 11. The alternator is electrically connected to a polyphase induction motor 12 having its rotor mounted on the shaft 13 of a propeller 14. The entire system will of course usually have more than one propeller and induction motor, and Fig. 1 is to be taken as merely representing the essential elements of the system. The propeller-driving motor 12 has its primary winding arranged to produce primary magnetic poles of the order of $n$, $\frac{3n}{2}$ and $2n$ poles when connected to polyphase systems of energy distribution of three-phases, quarter-phase, and three-phases, respectively. The armature winding of the alternator is, therefore, arranged to be connected so as to deliver alternating current energy in the form of three-phase currents or quarter-phase currents. Switches 15, 16, 17, 18 and 19 are provided in the connections between the alternator and motor for effecting these various circuit connections. These connections will now be explained in connection with Figs. 2 and 3.

The primary winding of the so-called three-phase induction motor is usually wound six-phase, with six phase-belts or coil-sections per pair of poles. This result is obtained by providing per pair of poles two phase-belts in which the direction of current flow is relatively opposite or displaced by 180 electrical degrees corresponding to each of the three phases of the source of supply. The currents in adjacent phase-belts are then displaced in phase by 60 electrical degrees, and the winding may be called a 60°, six-phase primary winding. Such a winding is diagrammatically represented by the first row of legends, $a$, $\bar{b}$, $c$, $\bar{a}$, $b$ and $\bar{c}$ of Fig. 2, where it is designated "$n$-poles 6 $\phi$." The letters $a$ and $\bar{a}$ represent the phase-belts or coil-sections connected to phase A, in which the currents are relatively opposite in direction or 180 electrical degrees out of phase, $b$ and $\bar{b}$ represent the corresponding phase-belts connected to phase B, and $c$ and $\bar{c}$ the corresponding phase-belts connected to phase C. All of the phase-belts of the same phase may be electrically connected in any suitable manner, for example, in series, in parallel, or partly in series and partly in parallel, as will be understood by those skilled in the art.

Six poles of the $n$-pole winding are represented in Fig. 2. The second row of legends of this figure represents the distribution of the phase-belts $p$, $q$, $\bar{p}$ and $\bar{q}$ of a $\frac{n}{2}$-pole quarter-phase primary winding, where each phase-belt has the same number of coils as the phase-belts of the $n$-pole winding. The phase-belts $p$, $q$, $\bar{p}$ and $\bar{q}$ are, therefore, directly beneath the phase belts $a$, $\bar{b}$, $c$, etc., of the $n$-pole winding. Nine poles of this winding are diagrammatically shown in Fig. 2, and the winding is designated "$\frac{3n}{2}$-poles Q$\phi$." The third row of legends is designated "$2n$-poles 3$\phi$" and represents a $2n$-pole primary winding wound with three phase-belts per pair of poles. The phase-belts $a$, $b$ and $c$ of this winding correspond to the phase-belts of the previous arrangements and are distributed as indicated in Fig. 2, where twelve poles of the complete winding are represented.

The vertical lines directly beneath the three rows of legends just described will now be assumed to represent the centers of the coil-sections or phase-belts of the primary winding of a motor embodying my present invention. The primary winding will be of the multiple layer drum type and will usually be a lap winding with two layers of conductors in each slot. If the coils of this winding are 100 per cent. pitch for $\frac{3n}{2}$ poles, they will be 66⅔ per cent. pitch for $n$ poles and 133⅓ per cent. pitch for $2n$ poles. The relative pitches of the primary coils with respect to the three polar arrangements will be chosen to meet the particular conditions under which the motor is to operate, for example, so as to give the most favorable pitch for that pole number where the most efficient operation is desired. The three rows of legends above the vertical lines then represent the phases to which the coil-sections or phase-belts are connected for the corresponding polar arrangements, and indicate the particular electrical changes which each phase-belt must undergo in passing from one polar arrangement to either of the other two. The phase-belts which undergo the same electrical change in passing from one polar arrangement to another may be electrically connected in a single circuit or group, and it will be seen from an inspection of Fig. 2 that there will be twelve of such groups. Each circuit or group, therefore, contains those conductors which carry current relatively in the same way for any one of the three different polar arrangements of the primary winding. These twelve groups are designated by the legends beneath the vertical lines to indicate the particular change in their connections when the pole numbers of the primary winding are changed. Thus, group $ap$ is connected to phase A of the three-phase source of supply for $n$-poles and $2n$-poles and to phase P for $\frac{3n}{2}$ poles, group $\overset{+}{b} q$ is connected to phase B of the three-phase source for $n$-poles and $2n$ poles but with relatively reversed direction of current flow and to phase Q for $\frac{3n}{2}$ poles, and so on.

The electrical connections of the system of Fig. 1 will be understood by reference to Fig. 3. The primary winding of the motor 12 is divided into twelve groups as just explained in connection with Fig. 2. These groups are designated by the same legends as in Fig. 2. The four groups which are connected to phase A for both $n$ and $2n$ poles have one common terminal A'.and the four groups which are similarly connected to phases B and C, respectively, have common terminals B' and C', respectively. The six groups which are connected to phase P for $\frac{3n}{2}$ poles are permanently connected to form two star-connected circuits with neutrals P' and $\overline{P}'$. The six groups which are connected to phase Q for $\frac{3n}{2}$ poles have their other six terminals connected to switches 15, 16 and 17.

The armature winding of the generator 11 is a three-phase star-connected winding. One phase winding of the generator is divided into two sections 60 electrical degrees apart. These windings are connected to the generator phase-changing switch 15 in such a manner that two polyphase systems of energy distribution one of three-phase and the other of two-phase or quarter-phase may be produced. When the switch 15 is in its upper position, the generator winding is connected in two independent circuits to furnish a polyphase system of quarter-phase electromotive forces to the quarter-phase mains or bus bars P, $\overline{P}$, Q, $\overline{Q}$. When the switch 15 is in its lower position, the generator winding is star-connected to furnish a polyphase system of three-phase electromotive forces to the three-phase mains or bus bars A, B, C. Reversing switches 18 and 19 are included in the bus bars P, $\overline{P}$, Q, $\overline{Q}$ and A, B, C.

The generator switch 15 is a five-unit double-throw switch and in changing the generator windings from three-phase to quarter-phase alters the voltage per phase of the generator in the ratio of 1 to 0.71. In other words, the terminal voltage of the generator when furnishing quarter-phase electromotive forces is 71% of its terminal voltage when furnishing three-phase electromotive forces.

Two switches 16 and 17 are provided for effecting the pole-changing connections of the twelve primary circuits or groups of the motor 12. The switch 17 has four blades three of which are double-throw while the fourth, although shown as mechanically double-throw, is electrically effective in only one position. On the four-blade side, this switch connects the motor circuits for $\frac{3n}{2}$ poles, and on the three blade side prepares the motor for either $n$ or $2n$ poles. The second motor switch 16 has five blades, three of which are double-throw, while the other two are electrically only effective in one position. The switch 16 is in its neutral or "off" position when the motor is connected for $\frac{3n}{2}$ poles, and is thrown to its five-blade side for $n$ poles and to its three-blade side for $2n$ poles.

Referring particularly to Fig. 3 of the drawings when it is desired to operate the motor 12 as a $\frac{3n}{2}$-pole motor, the generator switch 15 is thrown to its upper position, the motor switch 16 is in its "off" position, and the other motor switch 17 is in its upper position. The twelve groups of the primary winding of the motor 12 are then electrically connected to the quarter phase mains P, $\overline{P}$, Q, $\overline{Q}$ as shown in Fig. 4. In Figs. 4, 5 and 6, the twelve primary circuits or groups of the motor 12 are designated by the same characteristic legends as in Figs. 2 and 3. In addition, each group is designated by a single letter to indicate the phase-belts, corresponding to the notation of Fig. 2, which are included in this group for the particular polar arrangement illustrated. For operation as an $n$-pole motor, the generator switch 15 is thrown to its lower position and the motor switches 16 and 17 are thrown to their upper and lower positions, respectively. The motor circuits are then electrically connected to the three-phase mains A, B, C as shown in Fig. 5. For operation as a $2n$ motor, the generator switch is in its lower position and the motor switches 16 and 17 are each in their lower positions. The motor circuits for this polar arrangement are electrically connected as shown in Fig. 6.

It will be seen from an inspection of Figs. 4, 5 and 6 that the motor circuits are connected as a three-circuit diametrical quarter-phase winding for $\frac{3n}{2}$ poles, as a four-circuit Y-connected six-phase winding for $n$ poles, and as a two-circuit Y-connected three-phase winding for $2n$ poles. It will be observed that the voltage impressed on each group of the primary winding is much less in the $2n$ pole arrangement than in the $n$-pole arrangement. For some requirements, it may be desirable to employ other arrangements of the circuits for $2n$-poles, and those skilled in the art will readily understand that any suitable arrangement of the motor circuits may be obtained by providing suitable motor switches.

The improved multi-polar motor of my present invention may have a secondary winding of any suitable type. The simplest type of secondary winding would be a low resistance squirrel cage winding, but for installations where speed control or increased torque is desired the secondary winding may be phase wound and arranged for connection to an external resistance. Where increased torque for particular conditions of operation are required, as for reversing in ship propulsion, a double squirrel cage winding may be of advantage, as explained in the Letters Patent of Ernst F. W. Alexanderson, No. 1,215,095, patented Feb. 6, 1917. Increased torque of the motor may also be obtained in the manner described in my copending application for Letters Patent, Serial No. 171,915, filed May 31, 1917. Such a modification of the present invention is illustrated in Figs. 7 and 8 of the drawings.

The upper portion of Fig. 7 is a legend-diagram of substantially the same type as explained in connection with Fig. 2. This legend diagram represents a primary winding having twelve groups or circuits arranged to be connected to a three-phase source of supply as a 16-pole or as a 32-pole winding, or to be connected to a quarter-phase source as a 24-pole winding. In the winding $n$ therefore equals 16. The coils of the primary winding are assumed to be full pitch for the 24-pole arrangement and are accordingly $66\frac{2}{3}$ per cent. pitch for the 16-pole arrangement and $133\frac{1}{3}$ per cent. pitch for the 32-pole arrangement. The letters N and S designate the polar distribution of the phase-belts of the associated legend-diagram.

In accordance with the invention of my aforementioned application, the primary winding is divided into two components such that when one component is disconnected from the source of supply alternate sections embracing 4, 6 or 8 poles, according as the primary winding is connected for 16, 24 or 32 pole, are idle or inactive. A compound or double secondary winding is provided one section of which is of low resistance and the other section of high resistance. In Fig. 7 of the drawings, I have shown a high resistance squirrel cage winding 20 and a low resistance secondary winding 31 arranged so that when alternate sections of the primary winding are inactive or idle secondary currents will flow in circuits including conductors corresponding to both active and idle sections of the primary winding, whereby the conductors of the high resistance winding 20 which are adjacent current-carrying conductors corresponding to idle sections of the primary winding are included by transformer action as a part of the secondary winding of the motor.

The coils of the winding 31 are connected to two sets of collector rings 33 and 34 so that with respect to 24 primary magnetic poles this secondary winding has twelve circuits connected in parallel between the collector rings 33 and similarly twelve circuits connected in parallel between the rings 34. For the sake of clearness, only the connections to the collector rings 33 have been fully indicated in the drawings. Every secondary coil or group of coils beneath primary phase-belts $p$ and $\bar{p}$ are connected in series to the similarly positioned secondary coil or group of coils six poles removed with respect to the 24-pole arrangement, and the terminals of these series-connected coils or groups of coils are connected to the collector rings 33. The secondary coils beneath primary phase-belts $q$ and $\bar{q}$ are similarly connected to the collector rings 34. For the motor of 24 poles there will, therefore, be twelve of these series-connected coils or groups of coils connected to each set of collector rings 33 and 34. The transformer action between the low resistance secondary winding 31 and the high resistance squirrel cage winding 20 is obtained by open-circuiting alternate sections of the primary winding embracing six adjacent poles with respect to the 24-pole arrangement.

It will be observed that the low resistance secondary winding 31 is effectively open-circuited for a primary magnetic field of 24 poles. This winding might, therefore, remain entirely inactive for this polar arrangement and all of the secondary current would then be forced to flow in the high resistance winding 20. Generally, however, it will be more desirable to provide external resistances 35 arranged to be connected between collector rings 33 and 34, respectively, and thus to complete the circuits of the winding 31. The resistance 35 may be adjustable and when entirely cut out so as to short-circuit the rings 33 and 34, respectively, the winding becomes electrically equivalent to a short-circuited low resistance winding.

Although the winding 31 is effectively open-circuited for 24-poles, it is internally short-circuited for either 16 or 32 poles. For the 16-pole arrangement, the secondary coils beneath primary phase-belts $a$, $b$ and $c$ are connected to the collector rings 33 to form in effect a short-circuited star-connected winding and the secondary coils beneath primary phase belts $\bar{a}$, $\bar{b}$ and $\bar{c}$ are similarly connected to the collector rings 34. For the 32-pole arrangement, the winding 31 is similarly a short-circuited, star-connected winding. The only difference between the short circuits for the 16- and 32-pole arrangements is that for 32 poles the "p" and "q" circuits connected to the collector rings 33 and 34, respectively, carry currents in the same direction, while for 16 poles the currents in these "p" and "q" circuits are 180 electrical degrees apart.

Fig. 8 of the drawings diagrammatically illustrates the manner of arranging the primary winding of the motor 12 in order to disconnect alternate sections from the supply mains. Each of the twelve primary groups or circuits $ap$, $bq$, etc., is divided into two components. One component remains permanently connected just as in Figs. 2 and 3 while the other component is provided with a switch 25 so that it may be disconnected from the source of supply. The disconnectible component of group $ap$ will include all of those phase-belts of this group which are in the alternate idle or inactive sections. In the particular winding shown in Fig. 7 the disconnectible component of group $ap$ will include the 19th and 43rd phase-belts while the other or basic component of this group will include the 7th and 31st phase-belts counting from the left end of the diagram. Only half of the complete motor diagram is shown in Fig. 7. The other groups are similarly divided into two components each of which includes two phase-belts. The switches 25 are preferably combined into a single switch so that all of the disconnectible components of the twelve groups may be simultaneously connected or disconnected from the source of supply.

When the switches 25 are closed the primary winding of the motor 12 is connected for normal operation with all coils thereof active. The low resistance secondary winding 31 is internally short-circuited for either 16 or 32 poles as previously explained. For 24 poles, however, the winding 31 is in effect open-circuited, for both the closed and open positions of the switches 25. All of the secondary current can then be forced to flow through the high resistance winding 20, or any proportion of the total secondary current can be caused to flow in the low resistance winding 31, by adjusting the amount of resistance included in the connections between the brushes 34 and the brush 35. A still different effective secondary resistance for 24 poles can be obtained by opening the switch 25 so that parts of the high resistance winding 20 are included by transformer action as a part of the effective secondary circuit of the motor. In addition, increased torque for both the 16- and 32-pole arrangements can be similarly obtained by opening the switches 25 whereby sections of the high resistance winding are included by transformer action as a part of the effective secondary circuit.

The arrangement illustrated in Figs. 7 and 8 is particularly advantageous in systems of electric ship propulsion. With the switch 25 closed, three efficient speed ranges are provided, a high speed range, a cruising speed range, and a low speed range. Reversing can be effected with either the 24- or 32-pole arrangement of the primary winding. With the 24-pole arrangement a very large reversing torque is available since the amount of current flowing in the low resistance winding can be restricted to zero if necessary. Furthermore, increased torque for starting or low speed maneuvering can be obtained with the 32-pole arrangement by opening the switches 25.

What I claim as new and desire to secure by Letters Patent of the United States is:—

1. A system of electric energy distribution comprising in combination an alternating current generator comprising windings adapted to be connected so as to deliver three-phase or quarter-phase electromotive forces, a multi-speed induction motor having a primary winding adapted to be connected so as to produce $n$ or $2n$ primary magnetic poles when connected to a three-phase source of alternating electromotive forces and so as to produce $\frac{3n}{2}$ primary magnetic poles when connected to a quarter-phase source of alternating electromotive forces and means for controlling the connections of the generator windings and the connections between said windings and said primary winding arranged to connect said primary winding to said generator so as to produce the primary magnetic fields of said different pole numbers.

2. A system of electric energy distribution comprising in combination an alternating current generator comprising windings adapted to be connected so as to produce polyphase systems of energy distribution of two different numbers of phases, a multi-speed induction motor having a primary winding arranged to be connected so as to produce a primary magnetic field of one pole number when supplied with one polyphase system of energy distribution produced by said generator and so as to produce a primary magnetic field of a different pole number when supplied with the other polyphase system of energy distribution produced by said generator, and means for controlling the connections of the generator windings and the connections between said windings and said primary winding arranged to connect said primary winding to said generator so as to produce the primary magnetic fields of said different pole numbers.

3. A multi-speed induction motor having a primary winding of the multiple layer drum type comprising twelve circuits and means for connecting said circuits so as to form a $\frac{3n}{2}$-pole quarter-phase primary winding with four terminals and so as to form either an $n$-pole six-phase or a $2n$-pole three-phase balanced primary winding with three terminals.

4. A multi-speed induction motor having a primary winding of the multiple layer drum type comprising twelve circuits, six of said circuits being permanently connected to form two star-connected circuits in parallel, the other six of said circuits being arranged in pairs with one terminal of each pair permanently connected to a corresponding pair of the other six circuits, and means for connecting said circuits so as to form a $\frac{3n}{2}$-pole quarter-phase primary winding and and so as to form either an $n$-pole six-phase or a $2n$-pole three-phase balanced primary winding.

5. A multi-speed induction motor having a primary winding of the multiple layer drum type comprising twelve circuits, each of said circuits containing those conductors which carry current relatively in the same way with respect to three different polar arrangements of the primary winding, said circuits being connected together so that the primary winding of the motor has not more than twelve terminals, and means for connecting said twelve terminals so that said primary winding is arranged to produce balanced primary magnetic fields of three different pole numbers.

6. A multi-speed induction motor having a primary winding comprising twelve circuits, each of said circuits containing those conductors which carry current relatively in the same way when the primary winding is arranged as a $\frac{3n}{2}$-pole quarter-phase winding or as an $n$-pole six-phase winding or as a $2n$-pole three-phase winding, said circuits being connected together so that the primary winding of the motor has not more than twelve terminals, and means for connecting said twelve terminals so that said primary winding is arranged to produce $n$ or $2n$ balanced primary magnetic poles when connected to a three-phase source of alternating current energy and so as to produce $\frac{3n}{2}$ primary magnetic poles when connected to a quarter-phase source of alternating current energy.

7. A multi-speed induction motor having a primary winding comprising twelve circuits, each of said circuits containing those conductors which carry current relatively in the same way when the primary winding is arranged as a $\frac{3n}{2}$-pole quarter-phase winding or as an $n$-pole six-phase winding or as a $2n$-pole three-phase winding, and means for connecting said circuits so that said primary winding is arranged to produce $n$ or $2n$ balanced primary magnetic poles when connected to a three-phase source of alternating current energy and so as to produce $\frac{3n}{2}$ primary magnetic poles when connected to a quarter-phase source of alternating current energy.

In witness whereof I have hereunto set my hand this 29th day of May, 1917.

CAMPBELL MACMILLAN.